(12) United States Patent
Tsang et al.

(10) Patent No.: US 8,436,307 B2
(45) Date of Patent: May 7, 2013

(54) MULTI-CAVITY OPTICAL SENSING AND THERMOPILE INFRARED SENSING SYSTEM

(75) Inventors: Koon-Wing Tsang, Fremont, CA (US); Cheng-Chung Shih, Fremont, CA (US)

(73) Assignee: Capella Microsystems Corp., Tortola (GB)

( * ) Notice: Subject to any disclaimer, the term of this patent is extended or adjusted under 35 U.S.C. 154(b) by 310 days.

(21) Appl. No.: 13/046,890

(22) Filed: Mar. 14, 2011

(65) Prior Publication Data
US 2012/0012966 A1 Jan. 19, 2012

Related U.S. Application Data

(60) Provisional application No. 61/364,800, filed on Jul. 15, 2010.

(51) Int. Cl.
*G01J 5/02* (2006.01)
(52) U.S. Cl.
USPC .................................. 250/339.04; 250/339.05
(58) Field of Classification Search .............. 250/339.04
See application file for complete search history.

(56) References Cited

U.S. PATENT DOCUMENTS

| | | | | |
|---|---|---|---|---|
| 5,693,942 A | * | 12/1997 | Endo et al. | 250/338.1 |
| 5,962,854 A | * | 10/1999 | Endo | 250/349 |
| 2010/0327393 A1 | * | 12/2010 | Meinel et al. | 257/467 |

* cited by examiner

*Primary Examiner* — Marcus Taningco
(74) *Attorney, Agent, or Firm* — WPAT, P.C.; Anthony King

(57) ABSTRACT

The present invention discloses a multi-cavity optical sensing and thermopile infrared sensing system, which comprises an optical sensing part, a dielectric layer, a plurality of optical cavities, and a plurality of thermocouples. The dielectric layer covers on the top of the optical sensing part. The optical cavities are formed by a plurality of metal reflectors inside the dielectric layer. The thermocouples are laterally disposed near the bottom of the dielectric layer. In addition, a low temperature region is formed in an area which is the overlapping of vertical projections of such thermocouples and the optical sensing part; a high temperature region is formed by the overlapping of vertical projections of such thermocouples, but without the overlaying which belongs to the vertical projection of the optical sensing part. Therefore, the system can sense the ambient light brightness, color conditions and human blackbody infrared signals within the range of 8-12 micrometers wavelength.

11 Claims, 3 Drawing Sheets

MULTI-CAVITY OPTICAL SENSING AND THERMOPILE INFRARED SENSING SYSTEM

BACKGROUND OF THE INVENTION

1. Field of the Invention

The present invention relates to an optical sensing and infrared sensing system, especially to a multi-cavity optical sensing and thermopile infrared sensing system which is capable of sensing the ambient light brightness, color conditions and human black body infrared signals within the range of 8-12 micrometers wavelength.

2. Brief Description of the Related Art

As the technology vigorously developing, varieties of electronic products take place in our daily life and work. Optical filter sensing devices and thermopile infrared sensing devices are also commonly applied to use, such as in smart phones, ATMs, kiosks and so on. Generally, an optical filter sensing device includes a filter structure which is a thin lamina made of Fabry-Perot resonant optical cavities and is capable of filtering different spectrum wavelengths and further to sense the ambient light brightness, color conditions and infrared rays reflected by objects. Moreover, the existing thermopile infrared sensing device is used to judge the existence of human being within the sensing range by sensing infrared rays of human body.

However, there is no such device that combines the optical filter sensing system and thermopile infrared sensing system. The commonly used method when both optical sensing system and thermopile infrared sensing system are needed is to set up an optical sensing device and a thermopile infrared sensing device respectively thereof. In practice, this method is not performed ideally and will increase extra expense. Therefore, to design a multi-cavity optical sensing and thermopile infrared sensing system which is capable of sensing the ambient light brightness, color conditions and human infrared blackbody signal within the range of 8-12 micrometers wavelength becomes an important issue nowadays.

SUMMARY OF THE INVENTION

In order to overcome the deficiencies of the preceding prior art, an objective of the present invention is to provide a multi-cavity optical sensing and thermopile infrared sensing system. Thus, the present invention can solve the question that the optical and thermopile sensing device are necessary to be set respectively such that the preceding prior arts are performed not ideally.

The multi-cavity optical sensing and thermopile infrared sensing system comprises an optical sensing part, a dielectric layer, a first resonant optical cavity, a first thermocouple, and a second thermocouple. The dielectric layer covers on the top of the optical sensing part. The first optical cavity is set inside the dielectric layer on the optical sensing part, wherein the first optical cavity is formed by a first metal reflective layer and a second metal reflective layer. The first and the second thermocouples are laterally disposed near the bottom of the dielectric layer, wherein the second thermocouple is disposed above the first thermocouple in parallel. Furthermore, in such dielectric layer, a low temperature region is formed in an area which is the overlapping of vertical projections of the first, second thermocouple and the optical sensing part. Meanwhile, a high temperature region is formed by the overlapping of vertical projections of the first and the second thermocouple, but without the overlaying which belongs to the vertical projection of the optical sensing part.

Wherein, a third thermocouple and a fourth thermocouple are further included. The third thermocouple is laterally disposed near the bottom of the dielectric layer and corresponds to the first thermocouple; the fourth thermocouple is laterally disposed in the dielectric layer and is above the third thermocouple in parallel. Furthermore, in such dielectric layer, a low temperature region is formed in an area which is the overlapping of vertical projections of the first, second, third and fourth thermocouple and the optical sensing part. Meanwhile, a high temperature region is formed by the overlapping of vertical projections of the first, second, third and fourth thermocouple, but without the overlaying which belongs to the vertical projection of the optical sensing part.

Wherein, the optical sensing part further comprises a base body, an epitaxial layer and a plurality of N+ electrode sections. The epitaxial layer is formed on a top end of the base body, and the plurality of N+ electrode sections is formed on the epitaxial layer thereof.

Wherein, a second optical cavity is further included, which is formed in the dielectric layer by the second and the third metal reflective layer and is set nearby the first optical cavity in a stepped pattern.

Wherein, the first optical cavity and the second optical cavity comprise different spectrum response.

Wherein, a thermoelectric conversion unit is disposed between the high temperature region and the low temperature region to receive a high temperature and a low temperature and thereof converse the temperature difference into a potential difference.

Wherein, the dielectric layer may be a nitride silicon ($Si_3N_4$) layer, a silicon dioxide ($SiO_2$) layer, or the mixture of both.

Wherein, the metal reflective layers comprise aluminum (Al), gold (Au), or silver (Ag).

Wherein, the multi-cavity optical sensing and thermopile infrared sensing system is completed by the technology of complementary metal oxide semiconductor (CMOS), bipolar transistor, or bi-complementary metal oxide semiconductor (BiCMOS).

As the foregoing, the multi-cavity optical sensing and thermopile infrared sensing system of the present invention has the following advantages:

(1) It is capable of sensing the ambient light brightness, color conditions and human black body infrared signals within the range of 8-12 micrometers wavelength.
(2) It is capable of combining the optical sensing system and thermopile infrared sensing system into a whole in practice.

BRIEF DESCRIPTION OF THE INVENTION

The detail structure, the applied principle, the function and the effectiveness of the present invention can be more fully understood with reference to the following description and accompanying drawings, in which.

DETAILED DESCRIPTION OF THE PREFERRED EMBODIMENTS

Figure 1:
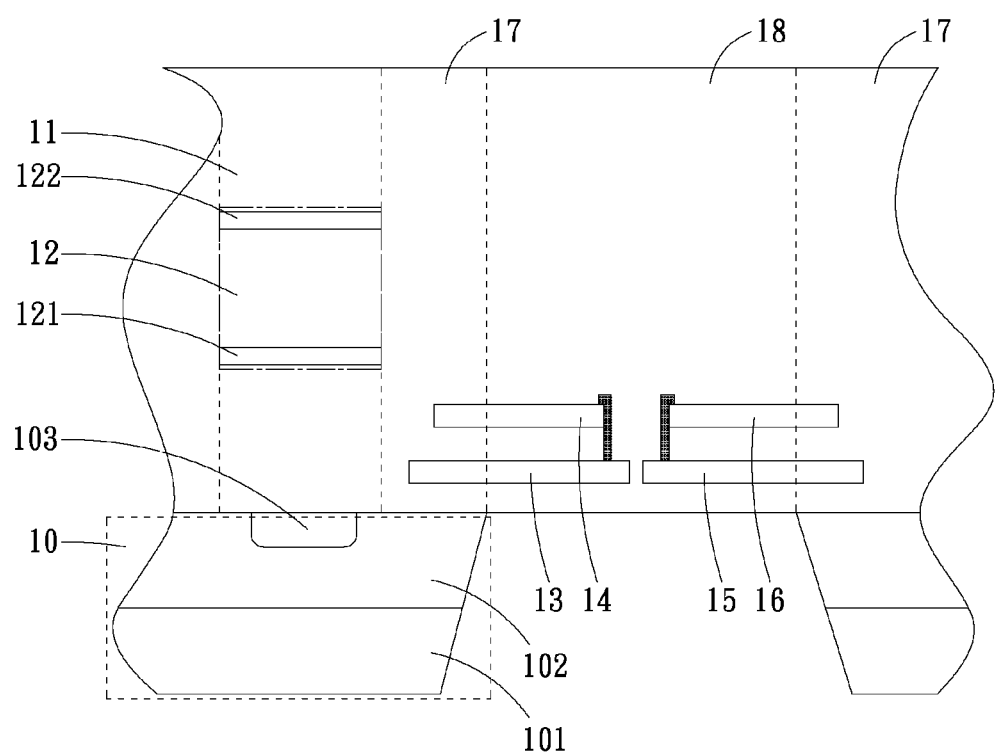
FIG. 1 is a schematic view of the first embodiment of the multi-cavity optical sensing and thermopile infrared sensing system according to the present invention.

Referring to FIG. 1, it is a schematic view of the first embodiment of the multi-cavity optical sensing and thermopile infrared sensing system according to the present invention. As shown in FIG. 1, the multi-cavity optical sensing and thermopile infrared sensing system comprises an optical sensing part 10, a dielectric layer 11, a Fabry-Perot optical cavity 12, a first thermocouple 13, a second thermocouple 14, a third thermocouple 15, and a fourth thermocouple 16. The optical sensing part 10 includes a base body 101, an epitaxial layer 102 and a plurality of N+ electrode sections 103. The epitaxial layer 102 is formed on a top end of the base body 101, and the plurality of N+ electrode sections 103 is formed on the epitaxial layer 102 thereof. The dielectric layer 11 covers the epitaxial layer 102 and the plurality of N+ electrode sections 103, wherein the dielectric layer 11 is a nitride silicon ($Si_3N_4$) layer, a silicon dioxide ($SiO_2$) layer, or the mixture of both.

The multi-cavity optical sensing system comprises the optical sensing part 10, the dielectric layer 11, a first metal reflective layer 121 and a second metal reflective layer 122. The lower section of the dielectric layer 11 covers the epitaxial layer 102 and a plurality of N+ electrode sections 103 in sheet form; the first metal reflective layer 121 covers the lower section of the dielectric layer 11 in sheet form; the middle section of the dielectric layer 11 covers the first metal reflective layer 121 in sheet form; the second metal reflective layer 122 covers the middle section of the dielectric layer 11 in sheet form; and the upper section of the dielectric layer 11 covers the second metal reflective layer 122 in sheet form. By the foregoing arrangement, the manufacturing of the multi-cavity optical sensing structure can be achieved and a simple five-layer structure with the optical sensing part 10 is formed. Wherein, the metal reflective layers can be made of aluminum (Al), gold (Au), or silver (Ag).

Existing dielectric film optical filters requires 42 layers of film coating. The lower section of the dielectric layer 11 is a bottom layer; the first metal reflective layer 121 is a bottom reflecting layer; the middle section of the dielectric layer 11 is a central layer; the second metal reflective layer 122 is a top reflecting layer; and the upper section of the dielectric layer 11 is a top layer. The middle section of the dielectric layer 11 is used to transmit spectrum bands, and can be formed by plasma chemical vapor deposition method. The first metal reflective layer 121, the middle section of the dielectric layer 11, and the second metal reflective layer 122 are the center of the multi-cavity optical sensing structure, wherein the first metal reflective layer 121 and the second metal reflective layer 122 are raised and prevented from the influence of moisture by the assembled Fabry-Perot optical cavity 12 and the upper and lower section of the dielectric layer 11.

The first thermocouple 13 and the third thermocouple 15 are laterally disposed near the lower section of the dielectric layer 11, and the second and thermocouple 14 and the fourth thermocouple 16 are laterally disposed in the dielectric layer 11 and respectively above the first thermocouple 13 and the third thermocouple 15 in parallel. The first thermocouple 13 and the third thermocouple 15 are N-type thermocouples, while the second thermocouple 14 and the fourth thermocouple 16 are P-type thermocouples. Besides, as a human body approaches the thermopile infrared sensing structure, a low temperature region 17 is formed in an area in the dielectric layer 11 which is the overlapping of vertical projections of the first thermocouple 13, the second thermocouple 14 and the optical sensing part 10, but without the overlaying which belongs to the vertical projection of the first metal reflective layer 121 and the second metal reflective layer 122 at the dielectric layer 11. Moreover, in the dielectric layer 11, a low temperature region 17 is also formed in an area which is the overlapping of vertical projections of the third thermocouple 15, the fourth thermocouple 16 and the optical sensing part 10. Meanwhile, a high temperature region 18 is formed by the overlapping of vertical projections of the first thermocouple 13, the second thermocouple 14, the third thermocouple 15, and the fourth thermocouple 16, but without the overlaying which belongs to the vertical projection of the optical sensing part 10. A thermoelectric conversion unit is disposed between the high temperature region 18 and the low temperature region 17 to receive a high temperature and a low temperature and then converse the temperature difference into a potential difference in order to determine whether there exists a human being within the sensing range by sensing infrared rays of the human body.

Figure 2:
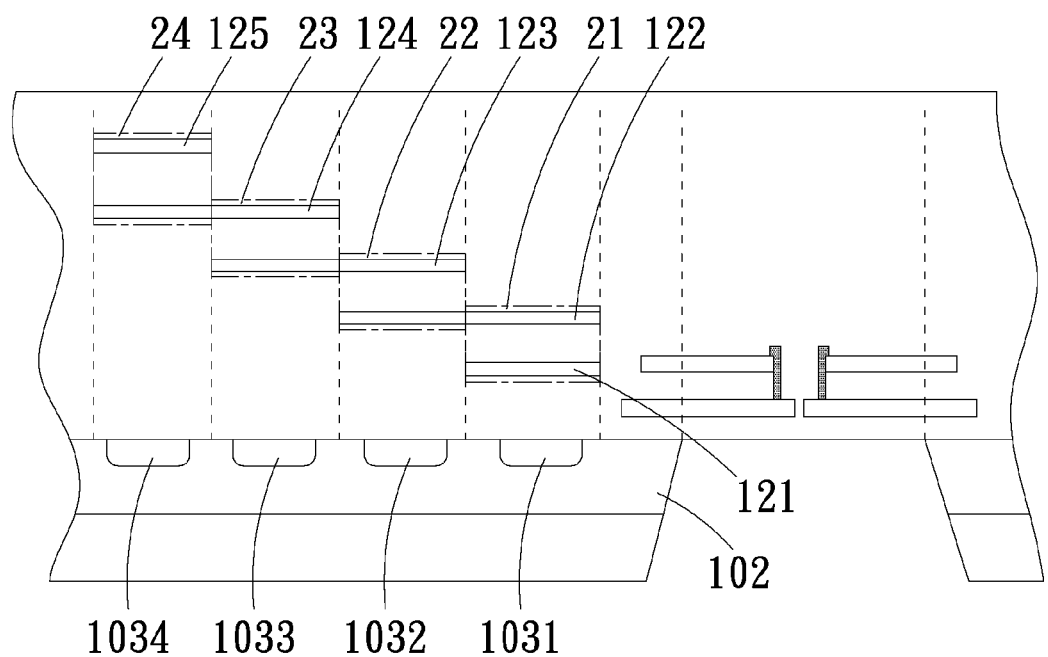
FIG. 2 is a schematic view of the second embodiment of the multi-cavity optical sensing and thermopile infrared sensing system according to the present invention.

Referring to FIG. 2, the multi-cavity optical sensing system comprises a plurality of N+ electrode sections 1031, 1032, 1033 and 1034 disposed on the surface of the epitaxial layer 102 and forms a multi-layer structure thereof in a way of that lower section of the dielectric layer 11 being on top of and covering the epitaxial layer 102 and the first N+ electrode sections 1031, the first metal reflector 121 being on top of and covering the lower section of the dielectric layer 11, middle section of the dielectric layer 11 being on top of and covering the first metal reflector 121, the second metal reflector 122 being on top of and covering the middle section of the dielectric layer 11, and upper section of the dielectric layer 11 being on top of and covering the second metal reflector 122; the lower section of the dielectric layer 11 being on top of and covering the epitaxial layer 102 and the second N+ electrode sections 1032, the second metal reflector 122 being on top of and covering the lower section of the dielectric layer 11, middle section of the dielectric layer 11 being on top of and covering the second metal reflector 122, the third metal reflector 123 being on top of and covering the middle section of the dielectric layer 11, and upper section of the dielectric layer 11 being on top of and covering the third metal reflector 123; the lower section of the dielectric layer 11 being on top of and covering the epitaxial layer 102 and the third N+ electrode sections 1033, the third metal reflector 123 being on top of and covering the lower section of the dielectric layer 11, middle section of the dielectric layer 11 being on top of and covering the third metal reflector 123, the fourth metal reflector 124 being on top of and covering the middle section of the dielectric layer 11, and upper section of the dielectric layer 11 being on top of and covering the fourth metal reflector 124; and the lower section of the dielectric layer 11 being on top of and covering the epitaxial layer 102 and the third N+ electrode sections 1034, the fourth metal reflector 124 being on top of and covering the lower section of the dielectric layer 11, middle section of the dielectric layer 11 being on top of and covering the fourth metal reflector 124, the fifth metal reflector 125 being on top of and covering the middle section of the dielectric layer 11, and upper section of the dielectric layer 11 being on top of and covering the fifth metal reflector 125.

Furthermore, the second metal reflectors 122 extends from the first N+ electrode section 1031 to the second N+ electrode section 1032; the third metal reflectors 123 extends from the second N+ electrode section 1032 to the third N+ electrode section 1033; and the fourth metal reflectors 124 extends from the third N+ electrode section 1033 to the fourth N+ electrode section 1034. The lower, middle and upper section of the dielectric layer 11 form the central dielectric layer 11 of the multi-cavity optical sensing system, wherein the deposition thickness of each section is controlled and processed by film deposition techniques such as plasma chemical vapor deposition method. The multi-layer structure of the multi-cavity optical sensing system is usually provided for use of trichromatic system and infrared sensing system. The trichromatic system consists of three primary colors that can be identified by human eyes, wherein the multi-cavity optical sensing system reacts with the wave peak of the trichromatic system. The upper part of the first N+ electrode section 1031 is designed for the 450 nm blue light wave peak; the upper part of the second N+ electrode section 1032 is designed for the 550 nm green light wave peak; the upper part of the third N+ electrode section 1033 is designed for the 650 nm red light wave peak; and the upper part of the fourth N+ electrode sections 1034 is designed for the 850 nm infrared wave peak. Hence, the system is capable of sensing and filtering to determine different lights and infrared rays with different wavelengths.

In this embodiment, the first metal reflector 121, middle section of the dielectric layer 11, and the second metal reflector 122 form a first Fabry-Perot optical cavity 21; the second metal reflector 122, middle section of the dielectric layer 11, and the third metal reflector 123 form a second Fabry-Perot optical cavity 22; the third metal reflector 123, middle section of the dielectric layer 11, and the fourth metal reflector 124 form a third Fabry-Perot optical cavity 23; and the fourth metal reflector 124, middle section of the dielectric layer 11, and the fifth metal reflector 125 form a fourth Fabry-Perot optical cavity 24 thereof.

The Fabry-Perot optical cavities 21, 22, 23 and 24 each has a distinct spectrum response, and are arranged in a way of that the second Fabry-Perot optical cavity 22 is set nearby the first Fabry-Perot optical cavity 21 in a stepped pattern; the third Fabry-Perot optical cavity 23 is set nearby the second Fabry-Perot optical cavity 22 in a stepped pattern; and the fourth Fabry-Perot optical cavity 24 is set nearby the third Fabry-Perot optical cavity 23 in a stepped pattern.

Figure 3:
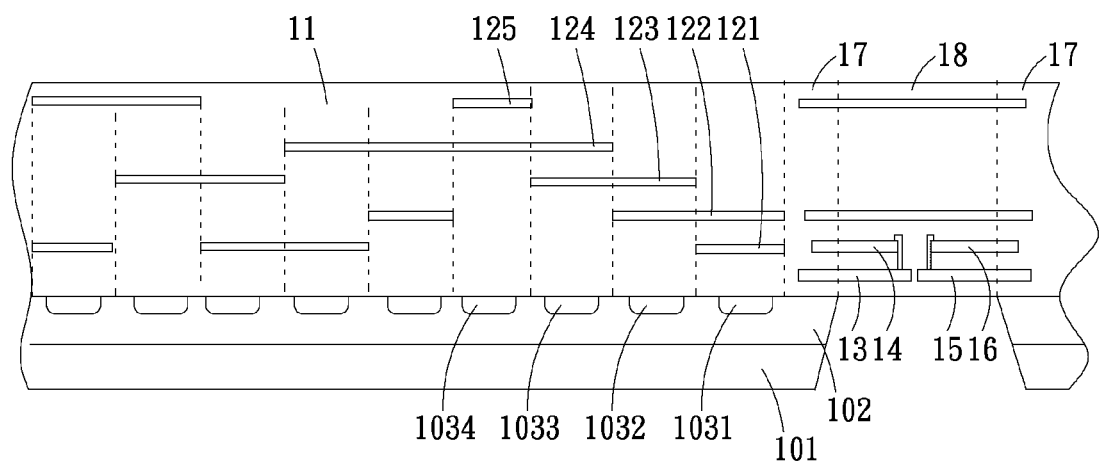
FIG. 3 is a schematic view of the third embodiment of the multi-cavity optical sensing and thermopile infrared sensing system according to the present invention.

Referring to FIG. 3, it is a schematic view of the third embodiment of the multi-cavity optical sensing and thermopile infrared sensing system according to the present invention. As shown in FIG. 3, the multi-cavity optical sensing and thermopile infrared sensing system can further extend laterally to sense the ambient light brightness, color conditions and human black body infrared signals, wherein the related structure and theory are similar to those described above.

In the foregoing embodiments of the present invention, the multi-cavity optical sensing and thermopile infrared sensing system is completed by the technology of complementary metal oxide semiconductor (CMOS), bipolar transistor, or bi-complementary metal oxide semiconductor (BiCMOS).

As the foregoing, the multi-cavity optical sensing and thermopile infrared sensing system is capable of sensing the ambient light brightness, color conditions and human black body infrared within the range of 8-12 micrometers wavelength.

While the invention has been described with reference to a preferred embodiment thereof, it is to be understood that modifications or variations may be easily made without departing from the spirit of this invention, which is defined in the appended claims.

What is claimed is:

1. A multi-cavity optical sensing and thermopile infrared sensing system, comprising:
    an optical sensing part;
    a dielectric layer covering on the top of the optical sensing part;
    a first optical cavity formed by a first metal reflective layer and a second metal reflective layer inside the dielectric layer;
    a first thermocouple laterally disposed inside and near the bottom of the dielectric layer; and
    a second thermocouple laterally disposed inside and near the bottom of the dielectric layer wherein the second thermocouple is disposed parallel to and above the first thermocouple;
    wherein, in the dielectric layer, a low temperature region is formed in an area which is the overlapping of vertical projections of the first thermocouple, the second thermocouple and the optical sensing part; a high temperature region is formed by the overlapping of vertical projections of the first thermocouple and the second thermocouple, but without the overlaying which belongs to the vertical projection of the optical sensing part.

2. The multi-cavity optical sensing and thermopile infrared sensing system as defined in claim 1, further comprising:
    a third thermocouple laterally disposed relatively to the first thermocouple near the bottom of the dielectric layer; and
    a fourth thermocouple laterally disposed relatively to the second thermocouple and above the third thermocouple in parallel;
    wherein, in the dielectric layer, a low temperature region is formed in an area which is the overlapping of vertical projections of the first thermocouple, the second thermocouple, the third thermocouple, the fourth thermocouple and the optical sensing part; a high temperature region is formed by the overlapping of vertical projections of the first thermocouple, the second thermocouple, the third thermocouple, and the fourth thermocouple, but without the overlaying which belongs to the vertical projection of the optical sensing part.

3. The multi-cavity optical sensing and thermopile infrared sensing system as defined in claim 1, wherein the optical sensing part further comprises:
    a base body;
    an epitaxial layer formed on a top end of the base body; and
    a plurality of N+ electrode sections formed on the epitaxial layer thereof.

4. The multi-cavity optical sensing and thermopile infrared sensing system as defined in claim 1, further comprising:
    a second optical cavity formed in the dielectric layer by the second metal reflective layer and a third metal reflective layer, wherein the second optical cavity is set nearby the first optical cavity in a stepped pattern.

5. The multi-cavity optical sensing and thermopile infrared sensing system as defined in claim 4, wherein the first optical cavity and the second optical cavity comprise different spectrum response.

6. The multi-cavity optical sensing and thermopile infrared sensing system as defined in claim 1, further comprising:
    a thermoelectric conversion unit disposed between the high temperature section and the low temperature section to receive a high temperature and a low temperature and further to converse the temperature difference into a potential difference.

7. The multi-cavity optical sensing and thermopile infrared sensing system as defined in claim 1, wherein the dielectric layer comprises a nitride silicon ($Si_3N_4$) layer, a silicon dioxide ($SiO_2$) layer, or the mixture of both.

8. The multi-cavity optical sensing and thermopile infrared sensing system as defined in claim 1, wherein the first thermocouple and the third thermocouple are N-type thermocouples.

9. The multi-cavity optical sensing and thermopile infrared sensing system as defined in claim 1, wherein the second thermocouple and the fourth thermocouple are P-type thermocouples.

10. The multi-cavity optical sensing and thermopile infrared sensing system as defined in claim 1, wherein the metal reflective layers comprise aluminum (Al), gold (Au), or silver (Ag).

11. The multi-cavity optical sensing and thermopile infrared sensing system as defined in claim 1, wherein the multi-cavity optical sensing and thermopile infrared sensing system is completed by the technology of complementary metal oxide semiconductor (CMOS), bipolar transistor, or bi-complementary metal oxide semiconductor (BiCMOS).

* * * * *